United States Patent
Naumann (10) Patent No.: US 9,562,825 B2
(45) Date of Patent: Feb. 7, 2017

(54) SHOCK SENSOR WITH LATCH MECHANISM AND METHOD OF SHOCK DETECTION

(71) Applicant: FREESCALE SEMICONDUCTOR, INC., Austin, TX (US)

(72) Inventor: Michael Naumann, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 185 days.

(21) Appl. No.: 14/535,960

(22) Filed: Nov. 7, 2014

(65) Prior Publication Data

US 2016/0131552 A1    May 12, 2016

(51) Int. Cl.
| | |
|---|---|
| *G01M 7/06* | (2006.01) |
| *G01P 15/08* | (2006.01) |
| *G01P 15/06* | (2006.01) |
| *G01P 15/03* | (2006.01) |
| *G01M 7/08* | (2006.01) |

(52) U.S. Cl.
CPC ............... *G01M 7/08* (2013.01); *G01P 15/03* (2013.01); *G01P 15/036* (2013.01); *G01P 15/06* (2013.01); *G01P 15/0891* (2013.01)

(58) Field of Classification Search
CPC ......... G01P 15/03; G01P 15/036; G01P 15/06; G01P 15/0891; H01H 45/14; H01H 45/141; H01H 45/145; H01H 2001/0042; G01M 7/08; F42C 15/24
See application file for complete search history.

(56) References Cited

U.S. PATENT DOCUMENTS

| | | | |
|---|---|---|---|
| 4,891,255 A | 1/1990 | Ciarlo | |
| 5,966,066 A | 10/1999 | Mehregany et al. | |
| 6,167,809 B1 * | 1/2001 | Robinson | F42C 15/184 102/235 |
| 6,321,654 B1 * | 11/2001 | Robinson | F42C 15/24 102/251 |

(Continued)

FOREIGN PATENT DOCUMENTS

AU    2010214666 A1 *   3/2011

OTHER PUBLICATIONS

Luke J. Currano, et al., "Latching in a MEMS Shock Sensor: Modeling and Experinnents", Sensors and Actuators, Physics, pp. 41-50, vol. 159, Issue 1, Apr. 2010.

(Continued)

*Primary Examiner* — Daniel J Colilla
(74) *Attorney, Agent, or Firm* — Charlene R. Jacobsen (57) ABSTRACT

A micromechanical shock sensor includes a proof mass coupled to a surface of a substrate and a projection element extending laterally from the proof mass. The shock sensor further includes a latch mechanism and a retention anchor. The latch mechanism has a latch spring attached to the surface and a latch tip extending from a movable end of the latch spring. The retention anchor is attached to the surface and is located proximate the latch tip. The proof mass is configured for planar movement relative to the substrate when the proof mass is subjected to a force of at least a threshold magnitude. Movement of the proof mass in response to the force causes the latch tip to become retained between the projection element and the retention anchor to place the shock sensor in a latched state. The latched state may be detected by optical inspection, probe, or external readout.

15 Claims, 7 Drawing Sheets

(56) References Cited

U.S. PATENT DOCUMENTS

| | | | |
|---|---|---|---|
| 6,737,979 B1 | 5/2004 | Smith et al. | |
| 6,964,231 B1 * | 11/2005 | Robinson | F42C 15/26 |
| | | | 102/231 |
| 7,051,656 B1 * | 5/2006 | Koehler | F42C 15/005 |
| | | | 102/222 |
| 7,148,436 B1 * | 12/2006 | Lee | H01H 1/0036 |
| | | | 200/181 |
| 2006/0220803 A1 * | 10/2006 | Kranz | G01P 15/0891 |
| | | | 340/426.24 |

OTHER PUBLICATIONS

Z.Y. Guo, et al., "A High-G Acceleration Latching Switch With Integrated Normally-Open/Close Paths Independent to the Proof-mass", pp. 885-888, IEEE Sensors, Nov. 2010.

* cited by examiner

SHOCK SENSOR WITH LATCH MECHANISM AND METHOD OF SHOCK DETECTION

TECHNICAL FIELD OF THE INVENTION

The present invention relates generally to a micromechanical shock sensor. More specifically, the present invention relates to a shock sensor with a latch mechanism for indicating whether a device or package associated with the shock sensor has been subjected to mechanical shock above a certain threshold acceleration level.

BACKGROUND OF THE INVENTION

Excessive vibration and/or shock during fabrication and assembly cycles, as well as during shipping, can damage fragile parts. Additionally, mechanical shock (such as dropping a device) is a critical damage-inducing event in many consumer and industrial electronics systems or packages. Thus, shock sensors are sometimes used in applications to monitor or detect shock forces imparted to an object that is fragile, under investigation, or of sufficient value. By way of example, monitoring the acceleration loads imposed on a package or system during fabrication, assembly, shipping, and in use can provide valuable information about the severity of a mechanical shock event and the likelihood of damage due to this event.

Accelerometers may be installed in some packages and systems as shock sensors to monitor for excessive acceleration, which can be an indicator of mechanical shock. Unfortunately, the use of conventional accelerometers in such packages and systems can require a constant power draw even when no acceleration or impact is present. In small-scale and/or long life packages and systems, such power draw can be highly undesirable. Therefore, no-power, small, low cost micromechanical shock sensor configurations are needed that could monitor for excessive shock and/or vibration during fabrication, assembly, and shipping activities, as well as in a wide variety of end use consumer and industrial devices.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, the Figures are not necessarily drawn to scale, and:

DETAILED DESCRIPTION

In overview, the present disclosure concerns micromechanical shock sensor configurations with a latch mechanism for indicating whether a package associated with the shock sensor has been subjected to mechanical shock. The present disclosure further concerns methods for shock detection using the micromechanical shock sensor configurations. The latch mechanism features low contact forces and, therefore, a reduced dependency of the threshold acceleration level on friction forces. Furthermore, the latch mechanism reliably remains in a latched state even in the presence of multi-axial accelerations or vibrations.

The shock sensor configurations discussed herein may be implemented as test devices to monitor for excessive shock and vibration during fabrication and assembly processes and/or during shipment where a shock sensor can provide an indication of possible damage occurring as a result of rough handling. Additionally, or alternatively, the shock sensor configurations may be implemented in consumer and industrial devices and systems for detecting whether those particular devices and systems have been exposed to a critical acceleration level that has the probability of causing device damage or failure. Furthermore, the shock sensor configurations can function without a power supply ensuring the detection of critical accelerations even in powered off devices or in devices that do not have a dedicated power supply.

Figure 1:
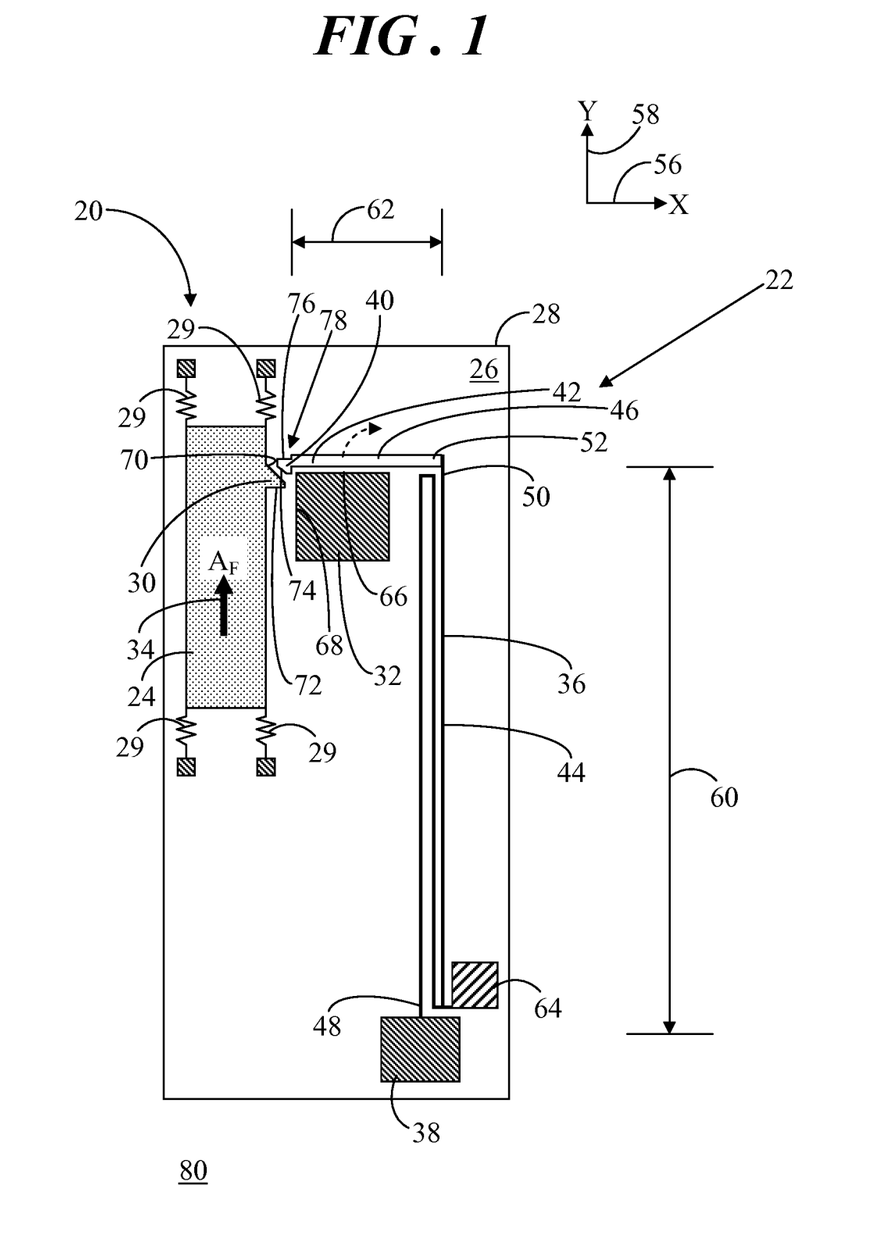
FIG. 1 shows a simplified and representative top view of a micromechanical shock sensor having a latch mechanism in accordance with an embodiment.

Referring to FIG. 1, FIG. 1 shows a simplified and representative top view of a micromechanical shock sensor 20 having a latch mechanism 22 in accordance with an embodiment. Thus, micromechanical shock sensor 20 may alternatively be referred to as a latch accelerometer. In general, shock sensor 20 includes a proof mass 24 coupled to a surface 26 of a substrate 28 via a spring system 29, a projection element 30 extending laterally from proof mass 24, latch mechanism 22, and a retention anchor 32. Proof mass 24 is configured for planar movement relative to surface 26 of substrate 28 when proof mass 24 is subjected to a force, referred to herein as an acceleration force 34 and labeled $A_F$ in FIG. 1, of at least a minimum threshold magnitude. Latch mechanism 22 includes a latch spring 36 attached to surface 26 of substrate 28 via a spring anchor 38 and a latch tip 40 extending from a movable end 42 of latch spring 36. Retention anchor 32 is located proximate latch tip 40.

In an embodiment, latch spring 36 of latch mechanism 22 includes a first beam structure 44 and a second beam structure 46, in which second beam structure 46 is arranged approximately orthogonal to first beam structure 44. First beam structure 44 has a first end 48 and a second end 50, and second beam structure 46 has a third end 52 and a fourth end, which is movable end 42. In the illustrated embodiment, first end 48 of first beam structure 44 is coupled to spring anchor 38 and second end 50 of first beam structure 44 is coupled to third end 52 of second beam structure 46. Thus, latch spring 36 is suspended above surface 26 of substrate 28 with its sole attachment point to substrate 28 being via spring anchor 38.

It should be understood that the use of relational terms, such as first and second, top and bottom, proximal and distal, and the like are used solely to distinguish one entity or action from another without necessarily requiring or implying any actual such relationship, prioritization, or sequential order between such entities or actions. FIG. 1 and subsequent FIGS. 2-6 are illustrated using various shading and/or hatching to distinguish the various elements from one another for clarity of illustration. These different elements within the structural layers may be produced utilizing current and upcoming micromachining techniques of depositing, patterning, etching, and so forth.

First beam structure 44 is characterized by a first stiffness and second beam structure 46 is characterized by a second stiffness in which the second stiffness is greater than the first stiffness. The stiffness of a spring element in a particular direction (e.g., stiffness in an X-direction parallel to an X-axis 56, stiffness in a Y-direction parallel to a Y-axis 58) corresponds to the resistance to deformation of the spring element that occurs in response to a force in that particular direction (e.g., force in the X-direction, force in the Y-direction). Stated another way, the stiffness of a spring element in each of the directions can be described quantitatively using a spring constant for each direction, where the spring constant for each direction can be expressed in the units of Newtons per meter (N/m). In this example, second beam structure 46 is stiffer than first beam structure 44 so that second beam structure 46 is relatively resistant to deformation occurring in response to acceleration force 34.

In an embodiment, first beam structure 44 is characterized by a first lengthwise dimension 60 that is arranged approximately parallel to a direction of movement of proof mass 24. Second beam structure 46 is characterized by a second lengthwise dimension 62 that is arranged approximately perpendicular to the direction of movement of proof mass 24. First lengthwise dimension 60 is greater than second lengthwise dimension 62. In this example, proof mass 24 is configured to move generally parallel to Y-axis 58. The greater length of first beam structure 44, relative to second beam structure 46 results in second beam structure 46 being less stiff than first beam structure. Additionally, first beam structure 44 may be a folded spring configuration and/or second beam structure 46 may be a thicker beam relative to first beam structure 44 in order to achieve the desired compliance or stiffness characteristics for first and second beam structures 44 and 46.

In some embodiments, latch mechanism 22 further includes a mass element 64 coupled to first beam structure 44 and suspended above surface 26 of substrate 28. As shown, mass element 64 may be coupled to first beam structure 44 at a location that is distal from second end 50 of first beam structure 44. As such, mass element 64 is displaced away from the junction of first beam structure 44 with second beam structure 46.

Second beam structure 46 is positioned adjacent to a first side 66 of retention anchor 32 and latch tip 40 extends laterally from the fourth end (i.e., movable end 42) of second beam structure 46 so that latch tip 40 is positioned approximately adjacent to a second side 68 of retention anchor 32, wherein second side 68 is contiguous with, but may arranged orthogonal to, first side 66. This second side 68 of retention anchor 32 faces projection element 30 extending from proof mass 24. Projection element 30 includes a first strike surface 70 and a first latch surface 72 opposing first strike surface 70. Correspondingly, latch tip 40 includes a second strike surface 74 and a second latch surface 76 opposing second strike surface 74. In some embodiments, second latch surface 76 includes an indent region 78, the purpose of which will be discussed below As mentioned briefly above, proof mass 24 is configured for planar movement relative to surface 26 of substrate 28 when proof mass 24 is subjected to acceleration force 34 of at least a minimum threshold magnitude. FIG. 1 represents a condition in which shock sensor 20 is in an unlatched state 80 in which latch tip 40 is not engaged with, i.e., is not in contact with, projection element 30. That is, proof mass 24 has not yet been subjected to acceleration force 34. Prior to movement of proof mass 24, second strike surface 74 of latch tip 40 faces first strike surface 70 of projection element 30.

The stiffness of each of first and second beam structures 44 and 46 is relatively low, and thus can be neglected. Accordingly, the mass of proof mass 24, the stiffness of spring system 29, and the amount of deflection/travel that proof mass is capable of are determining factors for establishing a minimum threshold magnitude of acceleration force 34 that is needed to cause activation of the latch mechanism 22. When proof mass 24 moves in response to acceleration force 34, projection element 30 strikes latch tip 40. More particularly, first strike surface 70 of projection element 30 impacts second strike surface 74 of latch tip 40. This impact primarily causes first beam structure 44 of latch spring 36 to suitably deform. This deformation results in latch tip 40 temporarily deflecting away from projection element 30 so that second latch surface 76 can pass first latch surface 72. This movement is depicted in FIG. 1 by a clockwise directed curved dashed line arrow.

Figure 2:
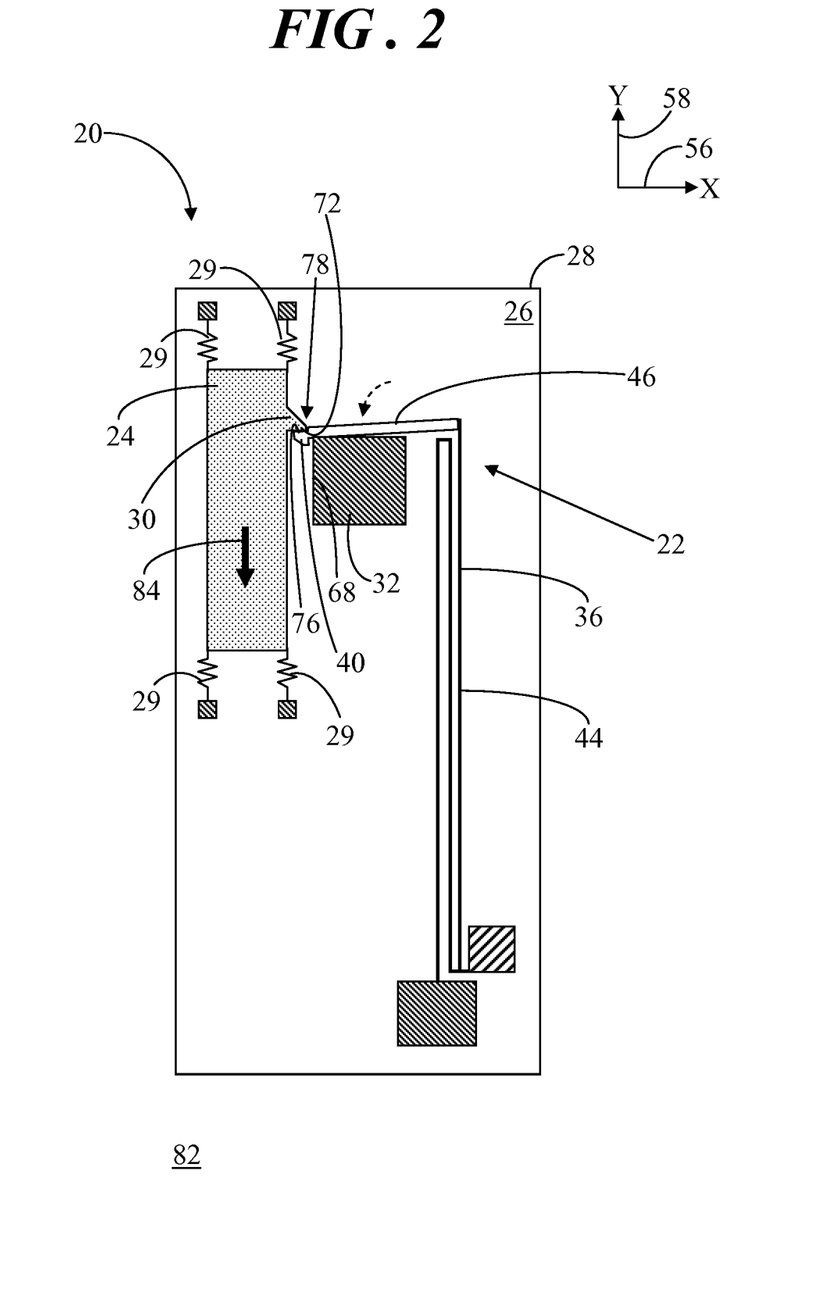
FIG. 2 shows a top view of the micromechanical shock sensor of FIG. 1 in a latched state.

FIG. 2 shows a top view of shock sensor 20 in a latched state 82. In response to being subjected to acceleration force 34 (FIG. 1), spring system 29 (movably coupling proof mass 24 to surface 26 of substrate 28) imparts a restoring force 84 on proof mass 24, which is opposite in direction to acceleration force 34. Restoring force 84 will cause proof mass 24 to return to its original position opposite the direction of movement of proof mass 24 resulting from acceleration force 34. In the meantime, spring force from first and second beam structures 44 and 46 will also cause latch spring 36 to return to its original position, as depicted in FIG. 2 by a counterclockwise directed curved dashed line arrow. Accordingly, latch tip 40 is now retained between projection element 30 and retention anchor 32. More particularly, second latch surface 76 of latch tip 40 now abuts first latch surface 72 of projection element 30 when shock sensor 20 is in latched state 82 with first latch surface 72 residing in indent region 78.

Conventional latch mechanisms are typically designed to be quite stiff (for example, they have short bending beams) in order to make sure that the latched state is not inadvertently released by acceleration/vibrations. However stiff latch mechanics can lead to the requirement for a relatively high minimum threshold magnitude of acceleration in order to trigger the latch mechanism. Furthermore, this requirement for high threshold magnitude of acceleration can cause a wide distribution of threshold accelerations between similar devices. More particularly, the minimum threshold magnitude of acceleration for shock sensors is affected by the roughness of contact surfaces of the latch mechanism. Variation of surface roughness determines the acting friction forces at the contact surfaces. Variation of surface roughness can cause a large variation of minimum threshold magnitudes of acceleration between similar latch mechanisms due to high contact forces pushing the rough contact surfaces against one another. The configuration of first and second beam structures 44 and 46, respectively, and the flexibility of second beam structure 46 effectively reduces the contact force without compromising the reliable retention of latch tip 40 between projection element 30 and retention anchor 32s when shock sensor 20 is in latched state 82.

Some prior art shock sensors (i.e., latch accelerometers) are susceptible to cross axis accelerations or any multi-axial accelerations. The retention of latch tip 40 between projection element 30 and retention anchor 32 largely prevents unintended release of latch mechanism 22. That is, latch tip 40 is protected from side motion by its retention between projection element 30 and retention anchor 32. Furthermore, mass element 64 ensures this retention of latch mechanism 22 in latched state 82 in the case of accelerations acting in different in-plane directions. More particularly, the inclusion of mass element 64 reduces the potential for deflection of second beam structure 46 in the Y-direction approximately parallel to Y-axis 58, thereby further ensuring that latch tip 40 remains retained between projection element 30 and second side 68 of retention anchor 32.

As mentioned previously, some embodiments include indent region 78 formed in second latch surface 76 of latch tip 40. The inclusion of indent region 78 enables the latching of latch mechanism 22 with relatively short travel distance requirements for proof mass 24 while still providing sufficient size of latch tip 40 extending laterally from second beam structure 46 so that it is effectively retained between projection element 30 and retention anchor 32.

The following description associated with FIGS. 3-6 provides various shock sensor configurations. The various shock sensor configurations are provided to enhance an understanding and appreciation for the inventive principles and advantages, rather than to limit in any manner the invention. Therefore, the ensuing discussion is not intended to be exhaustive or to limit the invention to the precise forms disclosed. Rather, it should become apparent to those skilled in the art that modifications or variations are possible. For clarity of description, the elements of the various shock sensor configurations that are equivalent to elements previously described in connection with FIGS. 1 and 2 will share the same reference numerals and will share the same shading and/or hatching. A description of those equivalent elements will not be repeated below for brevity.

Figure 3:
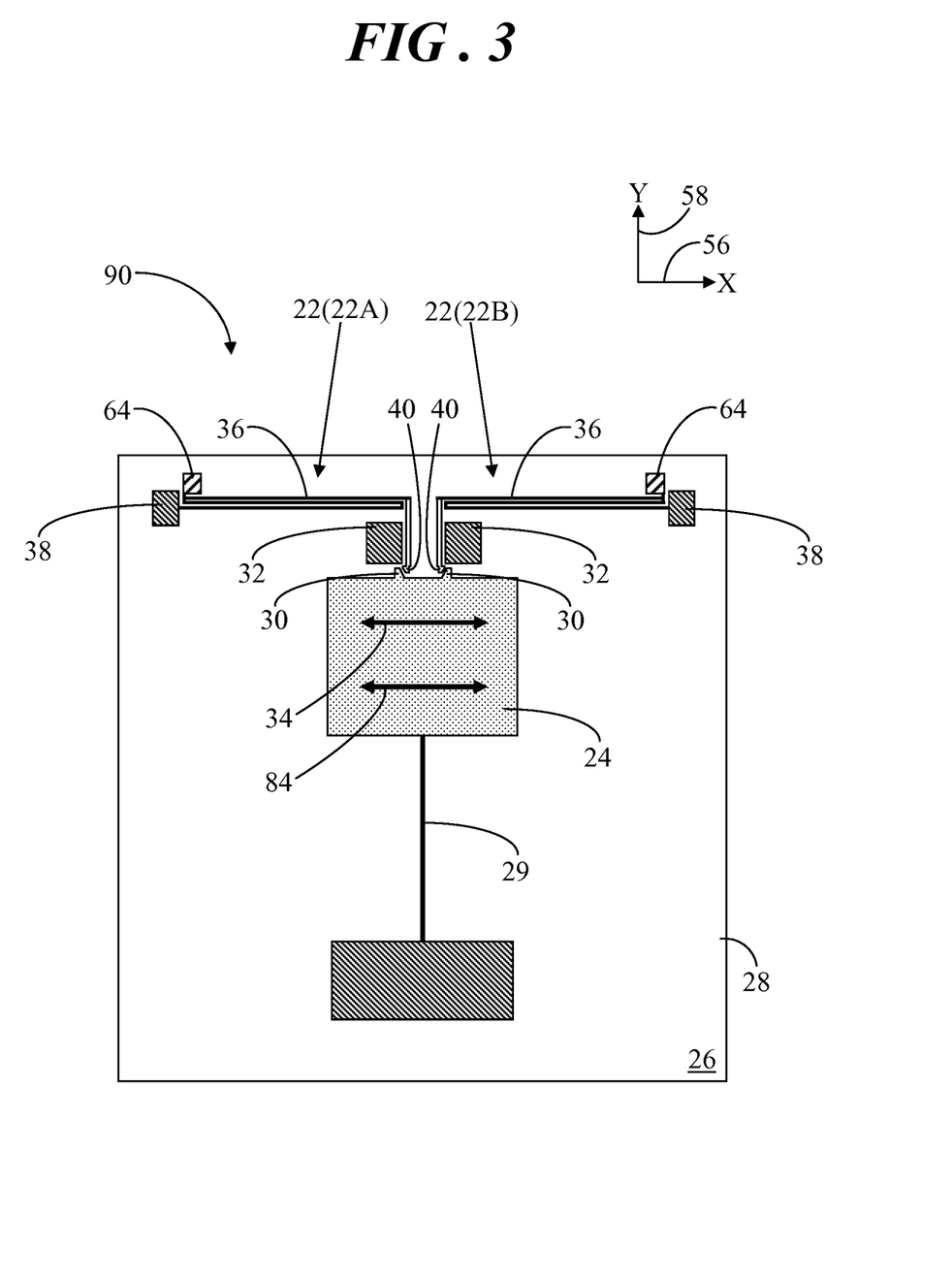
FIG. 3 shows a top view of a micromechanical shock sensor in accordance with an embodiment.

FIG. 3 shows a top view of a micromechanical shock sensor 90 in accordance with an embodiment. In general, shock sensor 90 includes proof mass 24 movably coupled to surface 26 of substrate 28 via spring system 29. In this configuration, spring system 29 enables movement of proof mass 24 in an X-direction generally parallel to X-axis 56 (for small displacements of proof mass 24) when proof mass 24 is subjected to acceleration force 34 in the X-direction of at least a minimum threshold magnitude.

In the illustrated embodiment of FIG. 3, shock sensor 90 includes a pair of projection elements 30 extending from proof mass 24. Additionally, shock sensor 90 includes a pair of latch mechanisms 22, each having latch spring 36 attached to surface 26 of substrate 28 via spring anchor 38, and each having latch tip 40 extending from latch spring 36. As further shown, each latch mechanism 22 further includes mass element 64. In accordance with an embodiment, shock sensor 90 further includes a pair of retention anchors 32, each of which is located proximate one of latch tips 40.

Shock sensor 90 enables directional latching of shock sensor 90. That is, movement of proof mass 24 rightward on the page in response to acceleration force 34 will cause latch spring 36 of one of latch mechanisms 22 (also labeled 22A in FIG. 3) to deflect such that when proof mass 24 is subjected to restoring force 84 via spring system 29, latch tip 40 of latch mechanism 22A will be retained between its corresponding projection element 30 and retention anchor 32. Conversely, movement of proof mass 24 leftward on the page in response to acceleration force 34 will cause latch spring 36 of the other latch mechanism 22 (also labeled 22B in FIG. 3) to deflect such that when proof mass 24 is subjected to restoring force 84 via spring system 29, latch tip 40 of latch mechanism 22B will be retained between its corresponding projection element 30 and retention anchor 32. Thus, depending upon the direction (positive X-direction or negative X-direction) of acceleration force 34 imposed on shock sensor 90, one of latch mechanisms 22 will be latched thereby placing shock sensor 90 in latched state 82 (FIG. 2).

Figure 4:
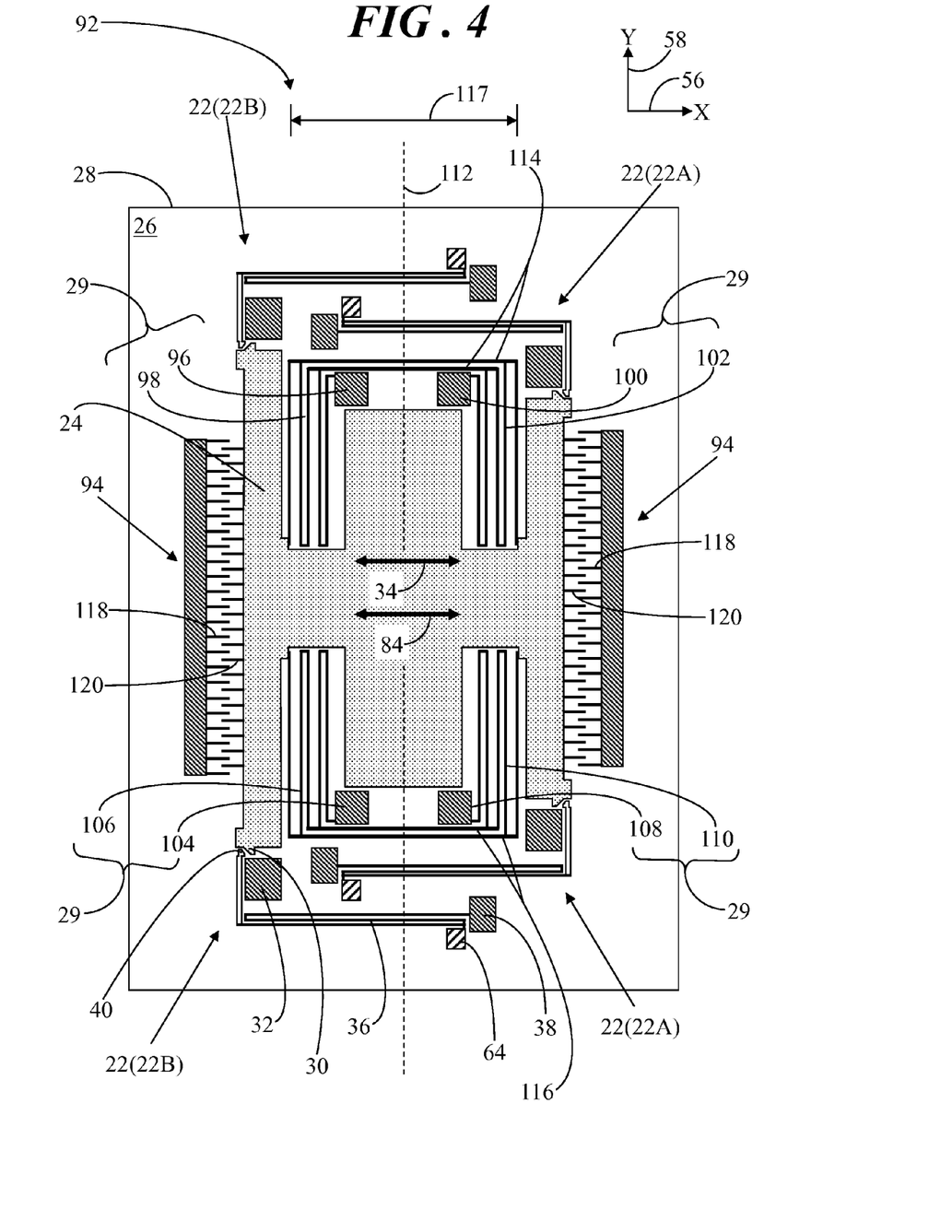
FIG. 4 shows a top view of a micromechanical shock sensor in accordance with another embodiment.

FIG. 4 shows a top view of a micromechanical shock sensor 92 in accordance with another embodiment. Micromechanical shock sensor 92 is provided to demonstrate a configuration that is stiffer, relative to the previous configurations, in directions that are orthogonal to the desired direction of movement of proof mass 24. Additionally, micromechanical shock sensor 92 is provided to demonstrate a configuration that includes detection electrodes 94 for detecting one of unlatched state 80 (FIG. 1) and latched state 82 (FIG. 2) of shock sensor 92.

In general, shock sensor 92 includes proof mass 24 movably coupled to surface 26 of substrate 28 via spring system 29. In this configuration, spring system 29 enables movement of proof mass 24 in an X-direction generally parallel to X-axis 56 when proof mass 24 is subjected to acceleration force 34 in the X-direction of at least a minimum threshold magnitude.

Spring system 29 for shock sensor 92 includes four spring/anchor structures. As shown, a spring/anchor structure includes a first anchor 96 attached to surface 26 of substrate 28 and a first spring 98 attached between first anchor 96 and proof mass 24. Likewise, another spring/anchor structure includes a second anchor 100 attached to surface 26 of substrate 28 and a second spring 102 attached between second anchor 100 and proof mass 24. Another spring/anchor structure includes a third anchor 104 attached to surface 26 of substrate 28 and a third spring 106 attached between third anchor 104 and proof mass 24. Yet another spring/anchor structure includes a fourth anchor 108 attached to surface 26 of substrate 28 and a fourth spring 110 attached between fourth anchor 108 and proof mass 24.

In an embodiment, first and second anchors 96, 100 are positioned opposite one another on opposing sides of an axis 112, or centerline, of proof mass 24. Additionally, first and second springs 98, 102 are positioned opposite one another on opposing sides of axis 112 of proof mass 24. Likewise, third and fourth anchors 104, 108 are positioned opposite one another on opposing sides of axis 112, and third and fourth springs 106, 110 are positioned opposite one another on opposing sides of axis 112.

Springs 98, 102, 106, 110 are folded beam springs, also known as meander springs. One or more connector beams 114 (two shown) interconnect equivalent turns of first spring 98 with second spring 102, and one or more connector beams 116 (two shown) interconnect equivalent turns of third spring 106 with fourth spring 110. A lengthwise dimension 117 of connector beams 114, 116 is arranged substantially orthogonal to axis 112. Thus, lengthwise dimension 117 of connector beams 114, 116 is generally parallel to the intended X-direction movement of proof mass 24.

Connector beams 114, 116 exhibit a stiffness in at least one direction that is substantially perpendicular to the intended X-direction movement of proof mass 24. As mentioned previously, prior art shock sensors can be susceptible to cross axis accelerations once latched. These cross axis accelerations can lead to relative motion between the movable and fixed latch components resulting in an unintended release. Connector beams 114, 116 maximize cross axis stiffness (in-plane and out-of-plane) of the movable proof mass 24 so that proof mass 24 is resistant to movement in the Y-direction (in-plane) and in the Z-direction (out-of-plane). This resistance to movement in the cross-axis directions further prevents an unintended release of latch mechanisms 22.

Shock sensor 92 further includes four of projection elements 30 extending from proof mass 24. Additionally, shock sensor 92 includes four latch mechanisms 22, each having latch spring 36 attached to surface 26 of substrate 28 via spring anchor 38, and each having latch tip 40 extending from latch spring 36. As further shown, each latch mechanism 22 further includes mass element 64. Shock sensor 92 further includes four retention anchors 32, each of which is located proximate one of latch tips 40.

The particular configuration of shock sensor 92 enables directional latching of shock sensor 92. That is, movement of proof mass 24 rightward on the page in response to acceleration force 34 will cause latch spring 36 of two of latch mechanisms 22 (also labeled 22A in FIG. 4) to deflect such that when proof mass 24 is subjected to restoring force 84 via spring system 29, latch tip 40 of each latch mechanism 22A will be retained between its corresponding projection element 30 and retention anchor 32. Conversely, movement of proof mass 24 leftward on the page in response to acceleration force 34 will cause latch spring 36 of the other latch mechanisms 22 (also labeled 22B in FIG. 4) to deflect such that when proof mass 24 is subjected to restoring force 84 via spring system 29, latch tip 40 of each latch mechanism 22B will be retained between its corresponding projection element 30 and retention anchor 32. Thus, depending upon the direction (positive X-direction or negative X-direction) of acceleration force 34 imposed on shock sensor 92, two of latch mechanisms 22 will be latched thus placing shock sensor 92 in latched state 82 (FIG. 2).

As mentioned briefly above, shock sensor 92 further includes detection electrodes 94. Detection electrodes 94 can include fixed fingers 118 coupled to surface 26 of substrate 28 and movable fingers 120 extending laterally from proof mass 24. Fixed fingers 118 are in alternating arrangement with movable fingers 120. A signal output from detection electrodes 94 (discussed in connection with FIGS. 7 and 8) may be utilized to determine whether shock sensor 92 is in unlatched state 80 (FIG. 1) or latched state 82 (FIG. 2).

Figure 5:
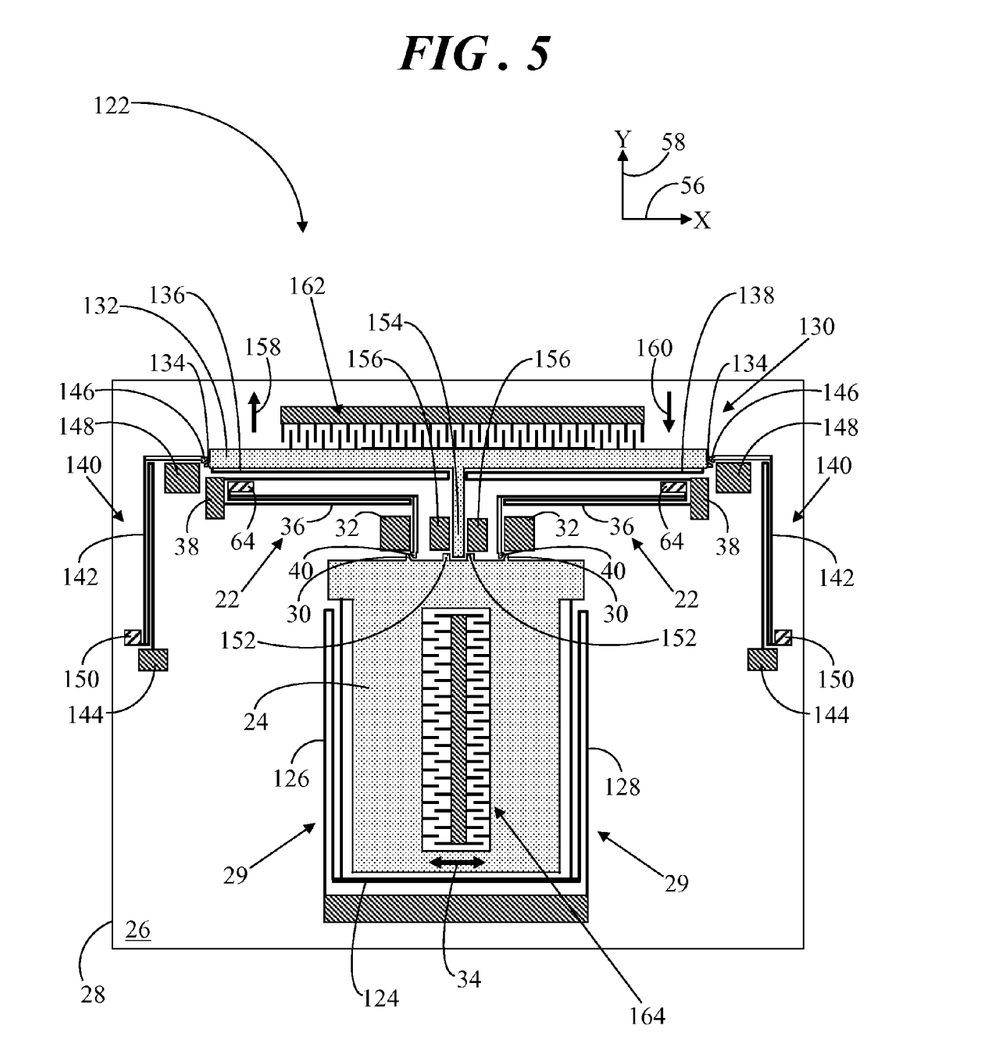
FIG. 5 shows a top view of a micromechanical shock sensor in accordance with another embodiment.

FIG. 5 shows a top view of a micromechanical shock sensor 122 in accordance with another embodiment. Micromechanical shock sensor 122 is provided to demonstrate a configuration in which a proof mass for the shock sensor is prevented from movement under certain conditions and is thereafter enabled for movement under subsequent conditions.

Accordingly, shock sensor 122 includes proof mass 24 movably coupled to surface 26 of substrate 28 via spring system 29, and a pair of projection elements 30 extend from proof mass 24. In this configuration, spring system 29 enables movement of proof mass 24 in an X-direction generally parallel to X-axis 56 when proof mass 24 is subjected to acceleration force 34 in the X-direction of at least a minimum threshold magnitude. Shock sensor 122 further includes a connector beam 124 interconnected between equivalent turns of springs 126, 128 of spring system in a manner similar to that described in connection with shock sensor 92 (FIG. 4).

Additionally, shock sensor 122 includes a pair of latch mechanisms 22, each having latch spring 36 attached to surface 26 of substrate 28 via spring anchor 38, and each having latch tip 40 extending from latch spring 36. As further shown, each latch mechanism 22 includes mass element 64. Shock sensor 122 further includes a pair of retention anchors 32, each of which is located proximate one of latch tips 40.

In accordance with an embodiment, shock sensor 122 includes a retaining structure 130 having a relatively stiff beam 132 coupled to surface 26 of substrate 28 via a second spring system and second projection elements 134 extending laterally from beam 132. In this example, the second spring system entails springs 136, 138, each of which is interconnected between beam 132 and spring anchors 38 so as to hold springs 136, 138 and beam 132 suspended above substrate 28.

Shock sensor 122 further includes second latch mechanisms 140, each of which has a second latch spring 142 suspended and attached to substrate 28 via a spring anchor 144. Each of second latch mechanisms 140 further includes a second latch tip 146 extending from second latch spring 142. Second retention anchors 148 are attached to surface 26, and each of second retention anchors 148 is located proximate its associated second latch tip 146. Each of second latch mechanisms 140 may additionally include a second mass element 150. The structure and function of projection elements 134, second latch mechanisms 140, second retention anchors 148, and second mass elements 150 is similar to the structure of projection elements 30, latch mechanisms 22, retention anchors 32, and mass elements 64. Therefore, further details of their particular structure are not repeated herein for brevity.

Under certain conditions, for example, during fabrication and assembly, shock sensor 122 may be subjected to a minimum threshold magnitude of acceleration force 34 in the X-direction that is sufficient to place shock sensor 122 in latched state 82 (FIG. 2) in which latch tip 40 of latch mechanism 22 is retained between projection element 30 and retaining anchor 32. However, shock sensor 122 may be intended to detect shock in an end use consumer or industrial package and shock sensor 122 may be designed to detect acceleration threshold levels within its end application that may already occur during fabrication. In order to prevent the unintended activation of shock sensor 122 during fabrication or assembly processes, it may be advantageous to prevent movement of proof mass 24 so as to prevent shock sensor 122 from being placed in latched state 82, and thereafter enable movement of proof mass 24 for detecting mechanical impact in the consumer or industrial package.

To that end, proof mass 24 may further include a retaining element, shown herein as a pair of extension members 152, extending laterally from proof mass 24. Beam 132 includes a corresponding fastener element 154 extending laterally from beam 132. In an embodiment, prior to movement of beam 132, fastener element 154 is engaged with extension members 152. By way of example, fastener element 154, in the form of a post is positioned between extension members 152. Anchors 156 may be formed on surface 26 of substrate 28 on opposing sides of fastener element 154 to largely prevent lateral movement of fastener element 154 in the X-direction and thereby prevent disengagement of fastener element 154 with extension members 152. Since fastener element 154 is engaged with extension members 152, proof mass 24 is largely prevented from movement in the X-direction.

At some point (for example, during or following fabrication and assembly), proof mass 24 may be enabled for movement. Accordingly, beam 132 can be subjected to a force 158 substantially parallel to Y-axis 58 that is sufficient to cause beam 132 to move in the Y-direction. When beam 132 moves in the Y-direction, fastener element 154 moves out of engagement with extension members 152. Additionally, second projection elements 134 strike second latch tips 146 which cause deflection of the corresponding second latch springs 142 so that second latch tips 146 are temporarily deflected away from second projection elements 134.

Springs 136, 138 impart a restoring force 160 on beam 132, which is opposite in direction to acceleration force 158. Restoring force 160 causes beam 132 to return to its original position opposite the direction of movement of beam 132 resulting from force 158. In the meantime, spring force from second latch springs 142 will also cause latch springs 142 to return to their original position. Accordingly, second latch tips 146 will be retained between second projection elements 134 and second retention anchors 148 so that retaining structure 130, and more particularly, beam 132, is held in a latched state. When retaining structure 130 is in the latched state, beam 132 is retained away from proof mass 24. Consequently, fastener element 154, which extends laterally from beam 132, disengages from extension members 152. Thereafter, proof mass 24 is enabled for movement. Once proof mass 24 is enabled for movement, shock sensor 122 functions similarly to shock sensor 90 (FIG. 3).

In some embodiments, shock sensor 122 may include electrodes 162 that are utilized for electrostatic actuation. That is, by applying a voltage between beam 132 and electrodes 162, force 158 in the form of electrostatic force acts to pull beam 132 toward electrodes 162, in the Y-direction parallel to Y-axis 58, to enable activation of latches 140. Thereafter, shock sensor 122 is enabled to sense acceleration, e.g., mechanical shock, in the X-direction parallel to X-axis 56. In other embodiments, beam 132 may have sufficient mass such that beam 132 can be subjected to force 158 in the form of an acceleration force substantially parallel to Y-axis 58 at a minimum threshold value sufficient to cause beam 132 to move in the Y-direction to enable activation of latches 140. Additionally, or alternatively, shock sensor 122 may include detection electrodes 164 for detecting one of unlatched state 80 (FIG. 1) and unlatched state 82 (FIG. 2) of shock sensor 122. Detection electrodes 164 may function similar to detection electrodes 94 (FIG. 4). As such, further description is not included herein for brevity.

Figure 6:
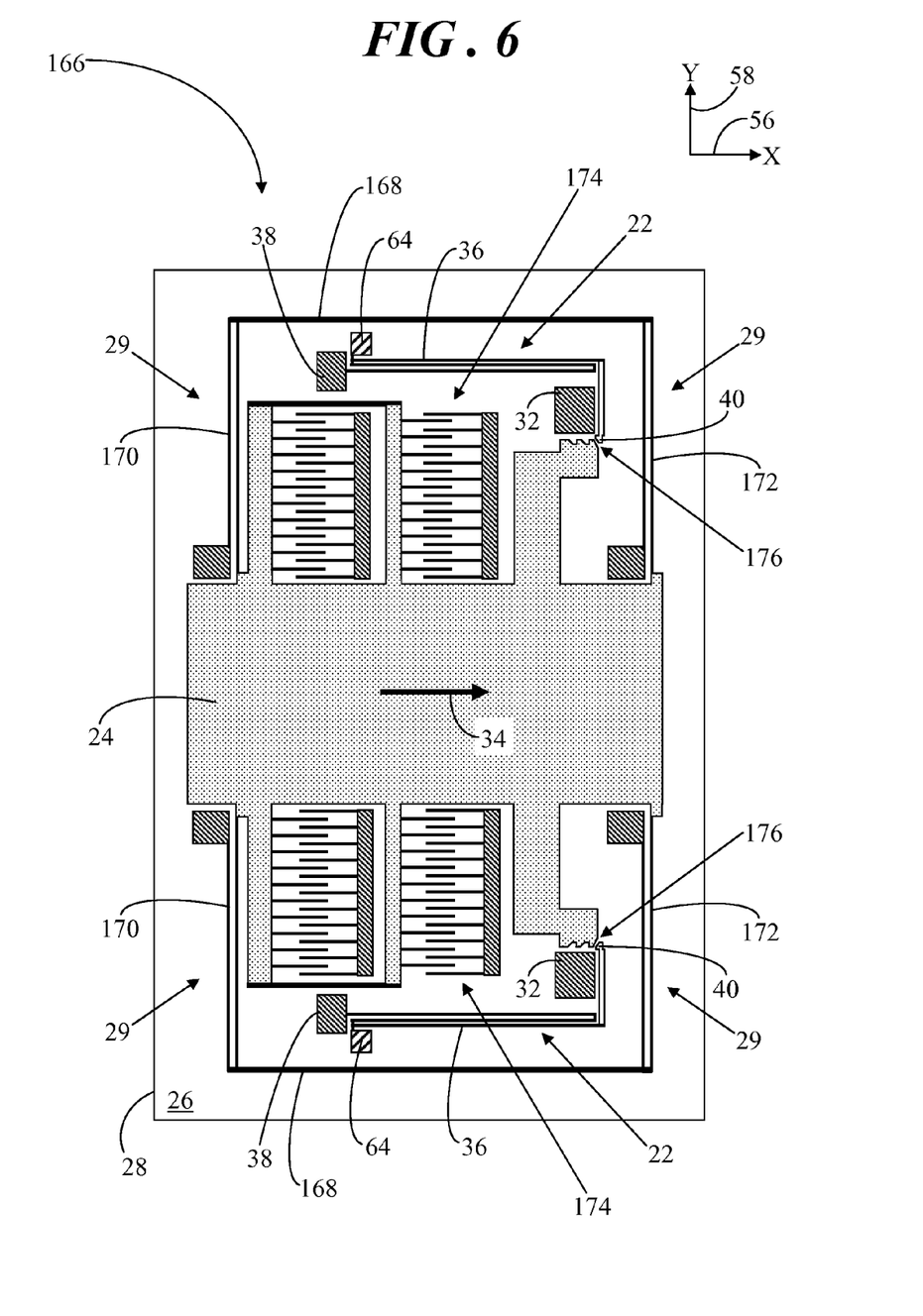
FIG. 6 shows a top view of a micromechanical shock sensor in accordance with yet another embodiment.

FIG. 6 shows a top view of a micromechanical shock sensor 166 in accordance with yet another embodiment. Micromechanical shock sensor 166 is provided to demonstrate a configuration in which latching holds the proof mass at a different level depending upon the magnitude of acceleration force applied to the proof mass.

Accordingly, shock sensor 166 includes proof mass 24 movably coupled to surface 26 of substrate 28 via spring system 29. Spring system 29 enables movement of proof mass 24 in an X-direction generally parallel to X-axis 56 when proof mass 24 is subjected to acceleration force 34 in the X-direction of at least a minimum threshold magnitude. Shock sensor 166 further includes a connector beam 168 interconnected between equivalent turns of springs 170, 172 of spring system 29 in a manner similar to that described in connection with shock sensor 92 (FIG. 4). Additionally, shock sensor 166 includes a pair of latch mechanisms 22, each having latch spring 36, spring anchor 38, latch tip 40 extending from latch spring 36, and mass element 64. Shock sensor 166 further includes a pair of retention anchors 32, each of which is located proximate one of latch tips 40. Shock sensor 166 may additionally include detection electrodes 174, similar to those described above.

In accordance with an embodiment, shock sensor 166 further includes a plurality of projection elements 176 extending from proof mass 24. When proof mass 24 moves in response to acceleration force 34, latch tip 40 of each of latch mechanisms 22 engages with one of projection elements 176 to hold proof mass 24 in latched state 82 (FIG. 2). The particular one of latch elements 176 with which latch tip 40 engages depends upon a magnitude of acceleration force 34, and the magnitude of acceleration force 34 determines how far proof mass 24 will move. Accordingly, the configuration of shock sensor 166 having multiple projection elements 176 enables shock sensor 166 to detect different acceleration levels. These different acceleration levels may be detected as output signals via detection electrodes 174, where the further proof mass 24 moves, the greater the output capacitance signal will be.

In a manufacturing environment, an undesirably high failure rate of parts (e.g., MEMS devices such as accelerometers, angular rate sensors, and so forth) may sometimes be attributed to excessive load conditions in terms of accelerations (vibration/shock). These excessive load conditions may be applied during handling, assembly, packaging, tape and reel, and other manufacturing processes. Unfortunately, the load conditions typically cannot be measured by conventional approaches using, for example, reference accelerometers or laser vibrometer, because these load conditions occur during a complex handling process where such measurements could not be taken. Therefore, it may be unknown as to whether the acting load conditions during manufacture are within a specified load range of the device or whether the loads exceed the specified load limit. If the acting load conditions exceed the specified load limit, then parts could actually be damaged during manufacture. Knowledge of the acting loads during various manufacturing processes could be beneficial to verify and ensure the quality of future products in terms of shock resistance.

One or more of the micromechanical shock sensors described above could be run through the fabrication and assembly cycles in order to identify critical load conditions. These critical load conditions would be identifiable when the shock sensor is in a latched state following a particular process step. That is, the position of latch tip 40 retained between projection element 30 and retention anchor 32 can serve as an indicator for indicating whether the shock sensor is in latched state 82 (FIG. 2) following any one of the particular process steps.

Figure 7:
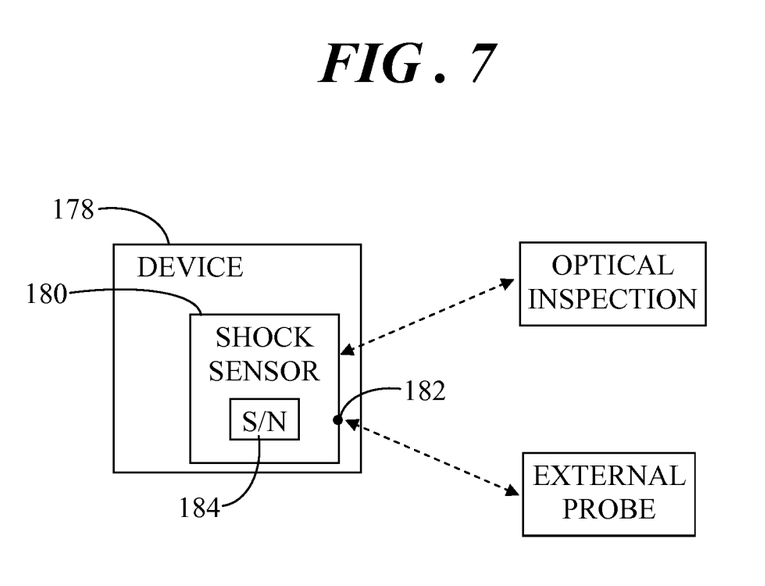
FIG. 7 shows a block diagram of a package having a micromechanical shock sensor provided therein.

FIG. 7 shows a block diagram of a device 178 having a micromechanical shock sensor 180 provided therein. Micromechanical shock sensor 180 may be in any of the shock sensor configurations described above in connection with FIGS. 3-6. Device 178 may be any of a variety of primarily handheld devices, such as laptops, smart phones, touch pads, digital cameras, camera lenses, and the like that have a certain risk of being dropped by consumers. Device 178 may alternatively be a television, stereo equipment, or any other device that is at risk of being dropped during transportation or installation. The implementation of shock sensor 180 within device 178 is advantageous in that shock senor 180 works without a power supply, thereby ensuring the detection of critical accelerations even if device 178 is powered off or if device 178 does not have its own power supply (e.g., a camera lens).

In an embodiment, shock sensor 180 may be configured for low threshold accelerations in the range of, for example, 100 g to 1000 g, that cause latch mechanism 22 (FIG. 1) to latch. Thus, the purpose of shock sensor 180 incorporated in device 178 is to detect whether device 178 has been exposed to a critical acceleration level or above. The term "critical acceleration level" refers to loads (shock accelerations) that are larger than a critical level, for which the chance of device damage or failure exceeds an acceptable probability. That is, above this critical acceleration level, the device manufacturer may no longer guarantee the proper operation of the device.

Knowledge of the shock/load history of device 178 could be beneficial for manufacturers and retailers of device 178 in terms of, for example, warranty claims, legal exchanges and returns, reduction of service costs, and so forth. In the case of warranty claims, it is sometimes unclear to the manufacturer as to what the customer actually did to the product, and whether the customer is attempting to abuse the product warranty or whether it is a valid warranty claim. For example, it can be difficult for a manufacturer to determine whether a small dent or scratch in the device case is a result of normal use or whether it is the reason for the malfunction of the product. Regarding legal exchanges and returns, customers usually have the right to return products within a certain time after purchase. For retailers and manufacturers, it could be beneficial to know whether a product is in good condition and is therefore eligible for return. In the instance of reduction of service costs (for handling, testing, and logistics beside the pure material costs involved with a warranty claim), if a customer could double-check as to whether a product is still eligible for warranty by checking the latch or unlatched state of shock sensor 180, the customer may decide not to ship the product to the manufacturer in order to examine the legitimacy of the warranty claim.

Shock sensor 180 provided with device 178 may be, for example, a pure capped silicon die without separate packaging and without an associated application specific integrated circuit (ASIC). Such a shock sensor 180 can be fabricated cost effectively with relatively few micromachined layers. A method for detecting shock applied to device 178 thus entails providing shock sensor 180 in device 178 and detecting when shock sensor 180 is in latched state 82 (FIG. 2) in which latch tip 40 (FIG. 2) is retained between projection element 30 (FIG. 2) and retention anchor 32 (FIG. 2).

Detection could entail optically inspecting (e.g., by infrared microscope) the position of latch tip 40 of shock sensor 180. Alternatively, detection could entail electrically probing a conductive feature 182 (e.g., metal bond pads) on shock sensor 180 to obtain a signal indicative of the position of latch tip 40. For example, conductive feature 182 may be electrically connected to the detection electrodes (e.g., detection electrodes 94, FIG. 4), where the detection electrodes provide the signal indicative of the position of latch tip 40. For example, the signal may be a measured capacitance in which the magnitude of the capacitance depends upon the position of the proof mass (i.e., whether it is in unlatched position 80 or latched position 82) and the amount of overlap of the electrode fingers. Thus, the position of latch tip 40 retained between projection element 30 and retention anchor 32 serves as an indicator (detected via optical inspection or probing) for indicating that shock sensor 180 is in latched state 82 (FIG. 2).

In some embodiments, shock sensor 180 may have an identifier, such as a serial number 184, associated with device 178. Serial number 184 may be etched into the silicon die of shock sensor 180 in order to prohibit fraud by replacement of shock sensor 180 in device 178.

Figure 8:
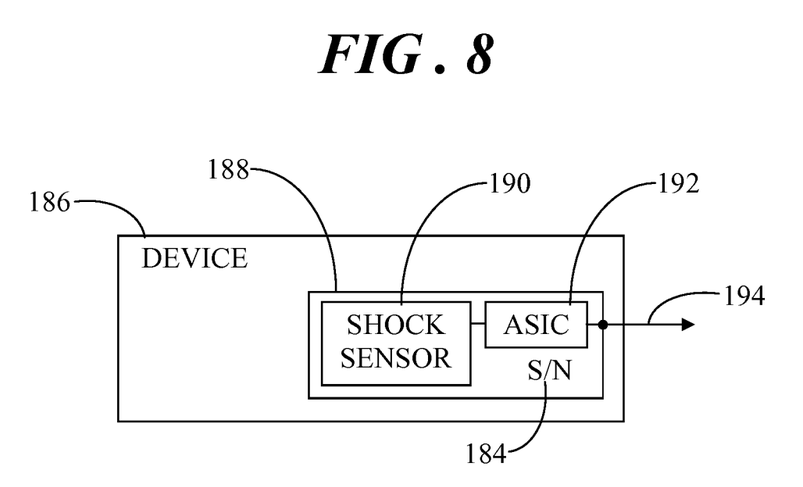
FIG. 8 shows a block diagram of a package having a micromechanical shock sensor provided therein in accordance with another embodiment.

FIG. 8 shows a block diagram of a device 186 having a micromechanical shock sensor device 188 provided therein in accordance with another embodiment. Again, device 186 may be any of a variety of devices, such as laptops, smart phones, touch pads, digital cameras, camera lenses, televisions, stereo equipment, or any other device that is at risk of being dropped.

In this example, shock sensor device 188 includes a shock sensor 190 and an application specific integrated circuit (ASIC) 192 electrically connected to shock sensor 190. Shock sensor 190 may be in any of the shock sensor configurations described above in connection with FIGS. 3-6. ASIC 190 provides a convenient readout by a manufacturer or customer of a signal indicative of the position of latch tip 40. Thus, detection can entail receiving an output signal 194 from ASIC 192, wherein output signal 194 may be derived from an output from detection electrodes (e.g., detection electrodes 94, FIG. 4). Accordingly, the position of latch tip 40 retained between projection element 30 and retention anchor 32 serves as an indicator (detected via signal output from ASIC 192) for indicating that shock sensor 190 is in latched state 82 (FIG. 2). In this example, serial number 184 may be programmed into ASIC 192 in order to prohibit fraud by replacement of shock sensor 180 in device 178.

Thus, various embodiments of a micromechanical shock sensor and a method for shock detection have been described. An embodiment of a micromechanical shock sensor comprises a proof mass coupled to a surface of a substrate and configured for planar movement relative to the substrate when the proof mass is subjected to a force of at least a threshold magnitude. A projection element extends laterally from the proof mass. The shock sensor further includes a latch mechanism having a latch spring attached to the surface and a latch tip extending from a movable end of the latch spring. A retention anchor is attached to the surface and is located proximate the latch tip, wherein movement of the proof mass in response to the force causes the latch tip to become retained between the projection element and the retention anchor to place the shock sensor in a latched state.

An embodiment of a method for detecting shock comprises providing a shock sensor, wherein the shock sensor includes a proof mass coupled to a surface of a substrate and configured for planar movement relative to the substrate when the proof mass is subjected to a force of at least a predetermined magnitude. A projection element extends laterally from the proof mass. A latch mechanism has a latch spring attached to the surface and a latch tip extending from a movable end of the latch spring. A retention anchor is attached to the surface and is located proximate the latch tip, wherein movement of the proof mass in response to the force causes the latch tip to become retained between the projection element and the retention anchor. The method further includes detecting when the shock sensor is in a latched state, the latched state being a condition in which the latch tip is retained between the projection element and the retention anchor.

The micromechanical shock sensor having a latch mechanism and methodology provides the capability of determining whether a device or package may be exposed to critical acceleration loads during fabrication and assembly, as well as in consumer and industrial packages and systems. The latch mechanism features low contact forces and, therefore, a reduced dependency of the threshold acceleration level on friction forces. Moreover, the latch mechanism reliably remains in a latched state even in the presence of multi-axial accelerations or vibrations. Furthermore, the shock sensor configurations function without a power supply ensuring the detection of critical accelerations even in powered off devices or in devices that do not have a dedicated power supply.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A micromechanical shock sensor comprising:
   a proof mass coupled to a surface of a substrate and configured for planar movement relative to said substrate when said proof mass is subjected to a force of at least a threshold magnitude;
   a projection element extending laterally from said proof mass;
   a latch mechanism having a latch spring attached to said surface and a latch tip extending from a movable end of said latch spring, wherein said latch spring comprises:
      a spring anchor attached to said surface of said substrate;
      a first beam structure having a first end coupled to said spring anchor; and
      a second beam structure, said first and second beam structures being suspended above said surface of said substrate, said second beam structure having a third end coupled to a second end of said first beam structure, said second beam structure being arranged approximately orthogonal to said first beam structure, and said latch tip being formed on a fourth end of said second beam structure, and wherein said fourth end is said movable end; and
   a retention anchor attached to said surface and located proximate said latch tip, wherein movement of said proof mass in response to said force causes said latch tip to become retained between said projection element and said retention anchor to place said shock sensor in a latched state.

2. The micromechanical shock sensor of claim 1 wherein:
   said first beam structure is characterized by a first lengthwise dimension that is arranged approximately parallel to a direction of movement of said proof mass; and
   said second beam structure is characterized by a second lengthwise dimension that is arranged approximately perpendicular to said direction of movement of said proof mass, said first lengthwise dimension being greater than said second lengthwise dimension.

3. The micromechanical shock sensor of claim 1 wherein:
   said first beam structure is characterized by a first stiffness; and
   said second beam structure is characterized by a second stiffness, said second stiffness being greater than said first stiffness.

4. The micromechanical shock sensor of claim 1 wherein said latch mechanism further includes a mass element coupled to said first beam structure and suspended above said surface of said substrate.

5. The micromechanical shock sensor of claim 4 wherein said mass element is coupled to said first beam structure at a location that is distal from said second end of said first beam structure.

6. The micromechanical shock sensor of claim 1 wherein:
   said second beam structure is positioned adjacent to a first side of said retention anchor; and
   said latch tip extends laterally from said fourth end of said second beam structure so that said latch tip is positioned adjacent to a second side of said retention anchor when said shock sensor is in said latched state, said second side of said retention anchor facing said projection element.

7. The micromechanical shock sensor of claim 1 wherein:
   said projection element includes a first strike surface and a first latch surface opposing said first strike surface; and
   said latch tip includes a second strike surface and a second latch surface opposing said second strike surface, said second strike surface facing said first strike surface prior to movement of said proof mass, and said second latch surface abutting said first latch surface when said shock sensor is in said latched state.

8. The micromechanical shock sensor of claim 1 wherein said planar movement of said proof mass is in a first direction, said projection element is a first projection element, said latch mechanism is a first latch mechanism, said latch spring is a first latch spring, and said micromechanical shock sensor further comprises:
   a beam structure coupled to said substrate and configured for said planar movement relative to said substrate, said beam structure being adapted to move in a second direction when subjected to a second force;
   a second projection element extending laterally from said beam structure;
   a second latch mechanism having a second latch spring attached to said surface and a second latch tip extending from a second movable end of said second latch spring; and
   a second retention anchor attached to said surface and located proximate said second latch tip, wherein movement of said beam structure in said second direction in response to said second force causes said second latch tip to become retained between said second projection element and said second retention anchor.

9. The micromechanical shock sensor of claim 1 further comprising a plurality of projection elements extending from said proof mass, wherein when said proof mass moves in response to said force, said latch tip engages with one of said plurality of projection elements depending upon a magnitude of said force applied to said proof mass.

10. The micromechanical shock sensor of claim 1 further comprising an indicator for indicating that said shock sensor is in said latched state.

11. A micromechanical shock sensor comprising:
   a proof mass coupled to a surface of a substrate and configured for planar movement relative to said substrate when said proof mass is subjected to a force of at least a threshold magnitude;
   a projection element extending laterally from said proof mass, said projection element including a first strike surface and a first latch surface opposing said first strike surface;

a latch mechanism having a latch spring attached to said surface and a latch tip extending from a movable end of said latch spring, said latch tip including a second strike surface and a second latch surface opposing said second strike surface, said second strike surface facing said first strike surface prior to movement of said proof mass; and a retention anchor attached to said surface and located proximate said latch tip, wherein movement of said proof mass in response to said force causes said latch tip to become retained between said projection element and said retention anchor to place said shock sensor in a latched state, and said second latch surface abuts said first latch surface when said shock sensor is in said latched state, wherein said second latch surface comprises an indent region and said first latch surface resides in said indent region when said shock sensor is in said latched state.

12. A micromechanical shock sensor comprising:
a proof mass coupled to a surface of a substrate and configured for planar movement relative to said substrate when said proof mass is subjected to a force of at least a threshold magnitude;
a first anchor attached to said surface of said substrate;
a second anchor attached to said surface of said substrate, said first and second anchors being located on opposing sides of an axis of said proof mass, wherein said proof mass is configured to move in a first direction that is approximately orthogonal to said axis;
a first spring attached between said first anchor and said proof mass;
a second spring attached between said second anchor and said proof mass;
a connector beam interconnecting said first spring with said second spring;
a projection element extending laterally from said proof mass;
a latch mechanism having a latch spring attached to said surface and a latch tip extending from a movable end of said latch spring; and
a retention anchor attached to said surface and located proximate said latch tip, wherein movement of said proof mass in response to said force causes said latch tip to become retained between said projection element and said retention anchor to place said shock sensor in a latched state.

13. A micromechanical shock sensor comprising:
a proof mass coupled to a surface of a substrate and configured for planar movement in a first direction relative to said substrate when said proof mass is subjected to a force of at least a threshold magnitude, wherein said proof mass comprises a retaining element extending laterally from said proof mass;
a first projection element extending laterally from said proof mass;
a first latch mechanism having a first latch spring attached to said surface and a first latch tip extending from a movable end of said latch spring;
a beam structure coupled to said substrate and configured for said planar movement relative to said substrate, said beam structure being adapted to move in a second direction when subjected to a second force, said beam structure comprising a fastener element extending laterally from said beam structure;
a second projection element extending laterally from said beam structure;

a second latch mechanism having a second latch spring attached to said surface and a second latch tip extending from a second movable end of said second latch spring;
a first retention anchor attached to said surface and located proximate said latch tip, wherein movement of said proof mass in response to said force causes said latch tip to become retained between said projection element and said retention anchor to place said shock sensor in a latched state; and
a second retention anchor attached to said surface and located proximate said second latch tip, wherein movement of said beam structure in said second direction in response to said second force causes said second latch tip to become retained between said second projection element and said second retention anchor, wherein:
prior to movement of said beam structure, said fastener element is engaged with said retaining element to prevent movement of said proof mass, and
when said second latch tip is retained between said second projection element and said second retention anchor, said fastener element is disengages from said retaining element to enable movement of said proof mass.

14. A device comprising:
a micromechanical shock sensor, said shock sensor including:
a proof mass coupled to a surface of a substrate and configured for planar movement relative to said substrate when said proof mass is subjected to a force of at least a predetermined magnitude;
a projection element extending laterally from said proof mass, said projection element including a first strike surface and a first latch surface opposing said first strike surface;
a latch mechanism having a latch spring and a latch tip, said latch spring including:
a spring anchor attached to said surface of said substrate;
a first beam structure having a first end coupled to said spring anchor; and
a second beam structure, said first and second beam structures being suspended above said surface of said substrate, and said second beam structure having a third end coupled to a second end of said first beam structure, said second beam structure being arranged approximately orthogonal to said first beam structure, said latch tip extending from a fourth end of said second beam structure, said latch tip including a second strike surface and a second latch surface opposing said second strike surface, said second strike surface facing said first strike surface prior to movement of said proof mass; and
a retention anchor attached to said surface and located proximate said latch tip, wherein movement of said proof mass in response to said force causes said first strike surface of said projection element to strike said second strike surface of said latch tip to cause said latch tip to become retained between said projection element and said retention anchor to place said shock sensor in a latch state, said second latch surface abutting said first latch surface when said shock sensor is in said latched state.

15. The device of claim 14 wherein said latch mechanism further comprises a mass element coupled to said first beam structure and suspended above said surface of said substrate, said mass element being coupled to said first beam structure at a location that is distal from said second end of said first beam structure.

* * * * *